United States Patent
Asadi et al.

(10) Patent No.: US 11,724,689 B2
(45) Date of Patent: Aug. 15, 2023

(54) SYSTEMS AND METHODS FOR PREDICTING AND DETECTING VEHICLE INSTABILITY

(71) Applicant: GM GLOBAL TECHNOLOGY OPERATIONS LLC, Detroit, MI (US)

(72) Inventors: Ehsan Asadi, North York (CA); Seyedeh Asal Nahidi, North York (CA); SeyedAlireza Kasaiezadeh Mahabadi, Novi, MI (US); Yubiao Zhang, Sterling Hieghts, MI (US); Hualin Tan, Novi, MI (US); Naser Mehrabi, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 39 days.

(21) Appl. No.: 17/447,679

(22) Filed: Sep. 14, 2021

(65) Prior Publication Data

US 2023/0077673 A1    Mar. 16, 2023

(51) Int. Cl.
*B60W 30/02* (2012.01)
*B60W 40/109* (2012.01)
(Continued)

(52) U.S. Cl.
CPC .......... *B60W 30/02* (2013.01); *B60W 40/103* (2013.01); *B60W 40/109* (2013.01); *B60W 40/114* (2013.01)

(58) Field of Classification Search
CPC .. B60W 30/02; B60W 40/103; B60W 40/109; B60W 40/114
See application file for complete search history.

(56) References Cited

U.S. PATENT DOCUMENTS

| 10,384,672 B1 * | 8/2019 | Katzourakis | B60W 10/22 |
| 2014/0129088 A1 * | 5/2014 | Meissner | B60W 10/20 701/41 |

(Continued)

FOREIGN PATENT DOCUMENTS

JP    2012066777    *  4/2012    .......... G60W 40/114

OTHER PUBLICATIONS

* Bobier-Tier, et al., "Vehicle control synthesis using phase portraits of planar dynamics,"Vehicle System Dynamics 2019, vol. 57, No. 9, 1318-1337 (Year: 2019).*

*Primary Examiner* — Joan T Goodbody
(74) *Attorney, Agent, or Firm* — Lorenz & Kopf LLP

(57) ABSTRACT

Systems and methods for controlling a vehicle are provided. The systems and methods include a sensor system and a processor configured to execute program instructions, to cause the at least one processor to: receive yaw rate values, lateral acceleration values and longitudinal velocity values for the vehicle from the sensor system, determine side slip angle parameter values based on the yaw rate values, lateral acceleration values and longitudinal velocity values, determine phase portrait angles based on the side slip angle parameter values and the yaw rate values, wherein the phase portrait angles each represent an angle between yaw rate and side slip angle for the vehicle in a phase portrait of yaw rate and side slip angle, detect or predict vehicle instability based at least on the phase portrait angles, and when vehicle instability is detected or predicted, control motion of the vehicle to at least partly correct the vehicle instability.

18 Claims, 4 Drawing Sheets

(51) Int. Cl.
*B60W 40/103* (2012.01)
*B60W 40/114* (2012.01)

(56) References Cited

U.S. PATENT DOCUMENTS

2014/0365078 A1* 12/2014 Gerecke ................ B62D 7/159
                                                      701/41
2018/0356819 A1* 12/2018 Mahabadi ............. B60W 30/08

* cited by examiner

SYSTEMS AND METHODS FOR PREDICTING AND DETECTING VEHICLE INSTABILITY

The present disclosure generally relates to systems and methods associated with vehicles for detecting and predicting instability of the vehicle.

Some automated vehicle control systems aim to maintain vehicle body stability. Some vehicle control systems utilize a model prediction control vehicle model to generate control action commands based on various inputs from a sensor system. Some model prediction control algorithms rely on some data that can be inaccurate or imprecise such as tire models, road surface conditions and lateral velocity. Such model predictive control methods would be improved if vehicle body instability could be accurately detected without use of less reliable data inputs.

Accordingly, it is desirable to provide systems and methods that can predict and detect vehicle body instability without necessarily requiring input data such as road condition and tire model. Additionally, it is desirable to provide vehicle instability detection and vehicle control using reliable input measurements, minimal number of measurements and low computational budget. Furthermore, other desirable features and characteristics of the present invention will become apparent from the subsequent detailed description and the appended claims, taken in conjunction with the accompanying drawings and the foregoing technical field and background.

SUMMARY

In one aspect, a system is provided for controlling a vehicle. The system includes a sensor system, and a processor in operable communication with the sensor system, wherein the processor is configured to execute program instructions, wherein the program instructions are configured to cause the processor to: receive yaw rate values, lateral acceleration values and longitudinal velocity values for the vehicle from the sensor system; determine side slip angle parameter values based on the yaw rate values, lateral acceleration values and longitudinal velocity values; determine phase portrait angles based on the side slip angle parameter values (e.g. time derivative of side slip angle) and the yaw rate values (e.g. time derivative of yaw rate), wherein the phase portrait angles each represent an angle between yaw rate and side slip angle for the vehicle in a phase portrait of yaw rate and side slip angle; detect or predict vehicle instability based at least on the phase portrait angles; and when vehicle instability is detected or predicted, control motion of the vehicle to at least partly correct the vehicle instability.

In embodiments, the side slip angle parameter values are a time derivative of side slip angle values and wherein the program instructions are configured to cause the processor to determine a time derivative of the yaw rate values and to determine the phase portrait angles based on the time derivative of the yaw rate values and the time derivative of the side slip angle values.

In embodiments, determining the phase portrait angles includes an inverse tangent function based on the side slip angle parameter values and the yaw rate values.

In embodiments, the program instructions are configured to cause the processor to determine speed magnitude values based on side slip angle parameter values and the yaw rate values, wherein the speed magnitude values represent a speed of movement of yaw rate and side slip angle for the vehicle within the phase portrait. Detecting vehicle instability is based at least on the phase portrait angles and the speed magnitude values.

In embodiments, detecting or predicting vehicle instability includes an early prediction of vehicle instability and a detection of vehicle instability. The early prediction of vehicle instability may be performed based at least on the phase portrait angles and on a minimum amount of change in the yaw rate values. The detection of vehicle instability may be performed based at least on the phase portrait angles and on a minimum amount of change in the side slip angle parameter values. The early prediction of vehicle instability may be performed based at least on the phase portrait angles representing a substantially vertical path in the phase portrait defined by changing yaw rate and substantially constant side slip angle. The detection of vehicle instability may be performed based at least on the phase portrait angles representing a substantially horizontal path in the phase portrait defined by changing side slip angle and substantially constant yaw rate.

In embodiments, when vehicle instability is detected or predicted, the program instructions are configured to cause the processor to determine a level of instability of the vehicle based on the side slip angle parameter values and to control motion of the vehicle to at least partly correct the vehicle instability based at least on the level of instability.

In embodiments, the motion of the vehicle is controlled to at least partly correct the vehicle instability by adjusting constraints in a model predictive control algorithm.

In embodiments, detecting or predicting vehicle instability is not based on road surface information or tire information.

In another aspect, a method for controlling a vehicle is provided. The method includes: receiving, via a processor, yaw rate values, lateral acceleration values and longitudinal velocity values for the vehicle from a sensor system; determining, via the processor, side slip angle parameter values based on the yaw rate values, lateral acceleration values and longitudinal velocity values; determining, via the processor, phase portrait angles based on (e.g. time derivative of) the side slip angle parameter values and (e.g. time derivative of) the yaw rate values, wherein the phase portrait angles each represent an angle between (e.g. time derivatives of) yaw rate and side slip angle for the vehicle in a phase portrait of yaw rate and side slip angle; detecting or predicting, via the processor, vehicle instability based at least on the phase portrait angles; and when vehicle instability is detected or predicted, controlling, via the processor, motion of the vehicle to at least partly correct the vehicle instability.

In embodiment, the side slip angle parameter values are a time derivative of side slip angle values. The method comprises determining, via the processor, a time derivative of the yaw rate values. Determining the phase portrait angles is based on the time derivative of the yaw rate values and the time derivative of the side slip angle values.

In embodiments, determining the phase portrait angles includes an inverse tangent function based on the side slip angle parameter values and the yaw rate values.

In embodiment, the method includes determining, via the processor, speed magnitude values based on side slip angle parameter values and the yaw rate values, wherein the speed magnitude values represent a speed of movement of yaw rate and side slip angle for the vehicle within the phase portrait. Detecting or predicting vehicle instability is based at least on the phase portrait angles and the speed magnitude values.

In embodiments, detecting or predicting vehicle instability includes an early prediction of vehicle instability and a detection of vehicle instability. The early prediction of vehicle instability is performed based at least on the phase portrait angles and on a minimum amount of change in the yaw rate values. The detection of vehicle instability is performed based at least on the phase portrait angles and on a minimum amount of change in the side slip angle parameter values.

In another aspect, a vehicle is provided. The vehicle includes a sensor system; and a processor in operable communication with the sensor system. The processor is configured to execute program instructions to cause the processor to: receive yaw rate values, lateral acceleration values and longitudinal velocity values for the vehicle from the sensor system; determine side slip angle parameter values based on the yaw rate values, lateral acceleration values and longitudinal velocity values; determine phase portrait angles based on the side slip angle parameter values and the yaw rate values, wherein the phase portrait angles each represent an angle between yaw rate and side slip angle for the vehicle in a phase portrait of yaw rate and side slip angle; detect or predict vehicle instability based at least on the phase portrait angles; and when vehicle instability is detected or predicted, control motion of the vehicle to at least partly correct the vehicle instability.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
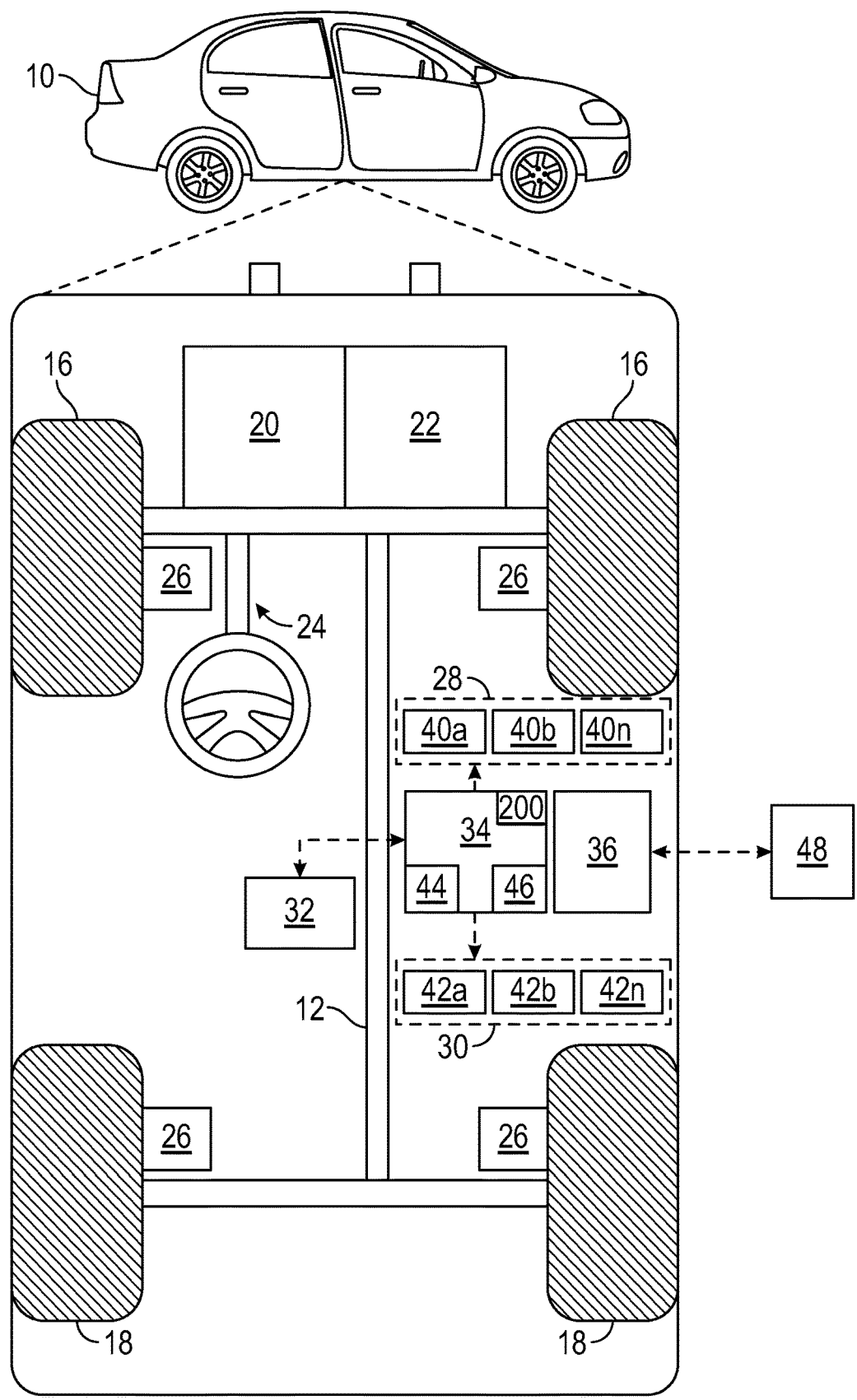
FIG. 1 is a functional block diagram illustrating a vehicle associated with a system for detecting and predicting vehicle instability, in accordance with various embodiments.

With reference to FIG. 1, a system for detecting and predicting vehicle instability shown generally at 200 is associated with a vehicle 10 in accordance with various embodiments. In general, the system 200 for detecting and predicting vehicle instability provides a methodology and an algorithmic structure to predict the behavior, and detect instability, of a body of the vehicle 10 based on body motion patterns in a phase portrait. The prediction and/or detection information may be used to adjust constraints of (or otherwise adjust) vehicle motion control. The system 200 for detecting and predicting vehicle instability may identify and utilize vehicle motion patterns in $\beta$ (side slip angle) versus r (yaw rate) phase portrait to predict and detect body instability of the vehicle 10. According to some embodiments, no tire model/information is required for body stability monitoring and system 200 for detecting and predicting vehicle instability is independent of road conditions. In embodiments described herein, the system 200 for detecting and predicting vehicle instability uses a minimal (3) number of measurements and reliable estimations. In addition to detection, the present system 200 may provide an early flag for body instability of the vehicle 10.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the system 200 for detecting and predicting vehicle instability is associated with the vehicle 10. The vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), shared passenger vehicles, coaches, etc., can also be used. In an exemplary embodiment, the vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, in other embodiments, the vehicle 10 is of a lower level of automation and includes advanced driver assistance systems (ADAS).

As shown, the vehicle 10 generally includes a propulsion system 20, a transmission system 22, a steering system 24, a brake system 26, a sensor system 28, an actuator system 30, at least one data storage device 32, at least one controller 34, and a connected system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. The sensor system 28 includes an inertial measurement unit and a longitudinal speed sensor. The sensor system 28 outputs yaw rate r, longitudinal speed $V_x$ and lateral acceleration $A_y$ as data inputs to the system 200 for detecting and predicting vehicle instability. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The connected system 36 is configured to wirelessly communicate information to and from other entities 48, such as but not limited to, other vehicles ("V2V" communication,) infrastructure ("V2I" communication), remote systems, and/or personal devices. In an exemplary embodiment, the connected system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the vehicle 10. In various embodiments, the data storage device 32 stores defined maps of the navigable environment. In various embodiments, the defined maps may be predefined by and obtained from a remote system (e.g. a cloud processing system). For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system. The data storage device 32 may store reference data 238 (see FIG. 3) for use by the system 200 for detecting and predicting vehicle instability.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

Figure 3:
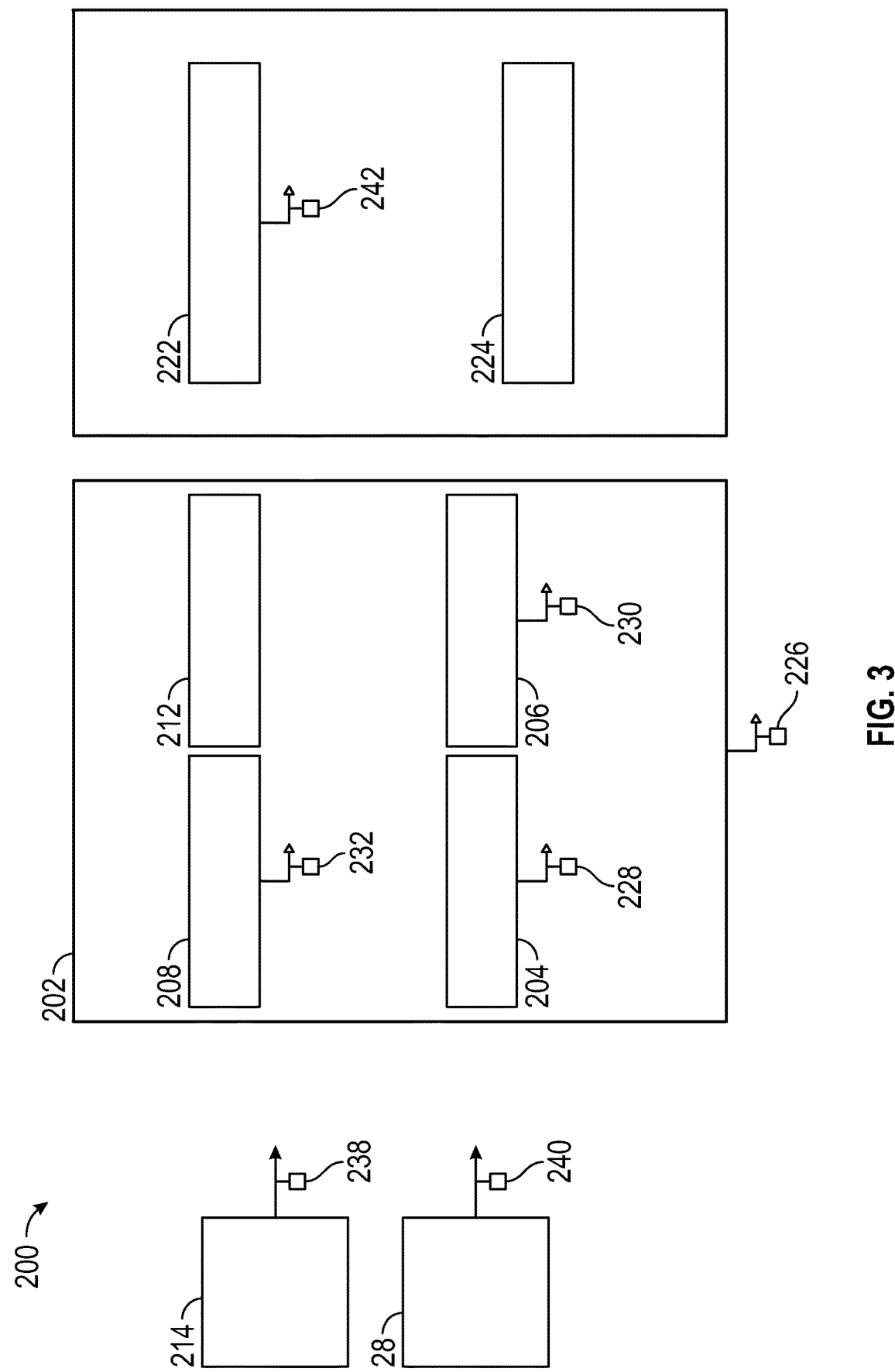
FIG. 3 is a functional block diagram of the system for detecting and predicting vehicle instability, in accordance with various embodiments.
Figure 4:
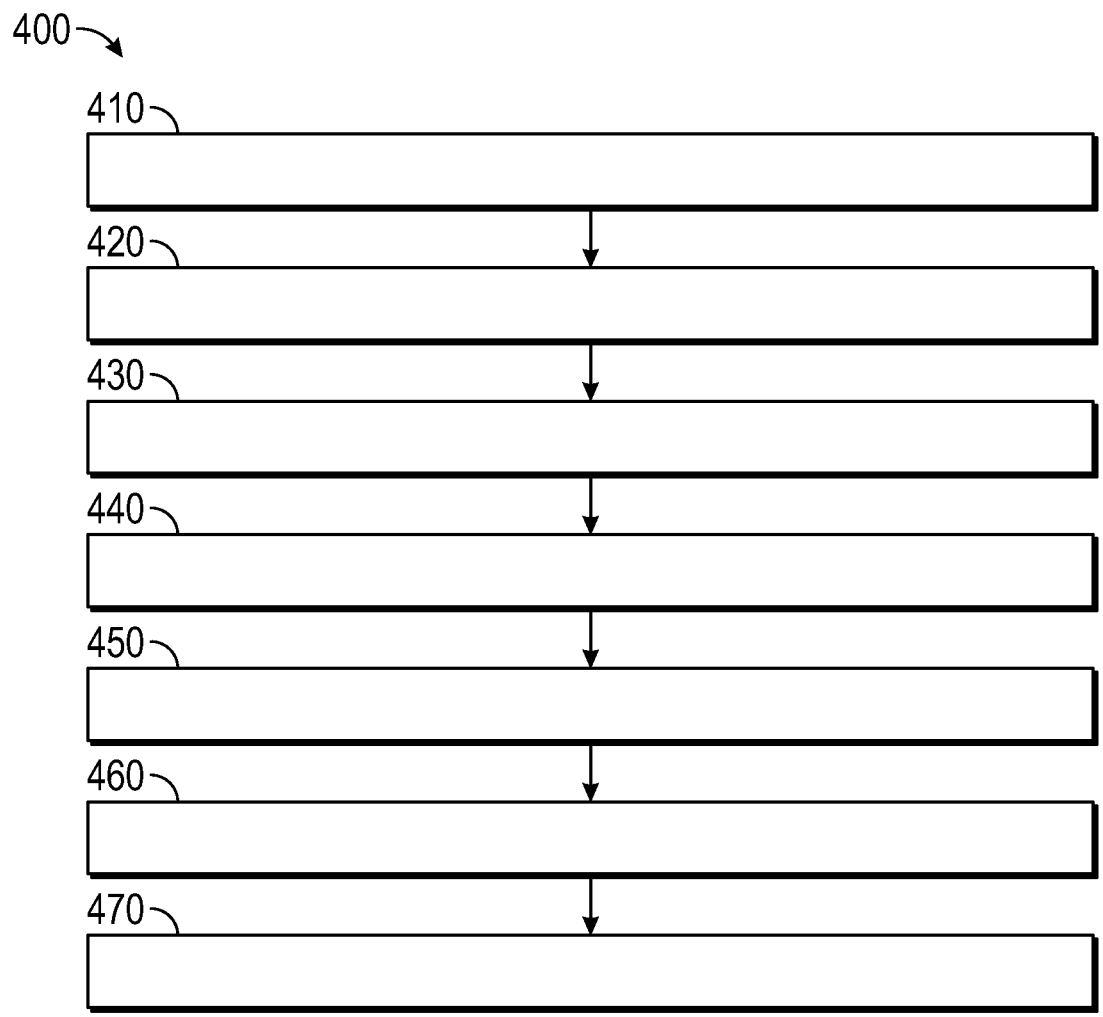
FIG. 4 is a flowchart illustrating a method of detecting and predicting vehicle instability, in accordance with various embodiments.

In various embodiments, one or more instructions of the controller 34 are embodied in the system 200 for detecting and predicting vehicle instability and, when executed by the processor 44, perform the functions described with respect to the system of FIG. 3 and the steps of the methods described with respect to FIG. 4. In particular, the processor 44 is configured by the instructions to receive input data representing state of the vehicle at the center of gravity of the vehicle 10 to predict imminent vehicle body instabilities or to detect current vehicle body instabilities. The system 200 for detecting and predicting vehicle instability body operates based on evaluating parameters representing vehicle body motion patterns in phase portraits. The system 200 for detecting and predicting vehicle instability can output data representing the predicted or detected vehicle instability, which can be used to adjust constraints or other parameters of a vehicle motion control system 220 (see FIG. 3). In one embodiment, constraints of a motion predictive control algorithm are adjusted based on the vehicle instability data output from the system 200 for detecting and predicting vehicle instability. As such, an enhanced control performance for the vehicle 10 can be realized.

Figure 2:
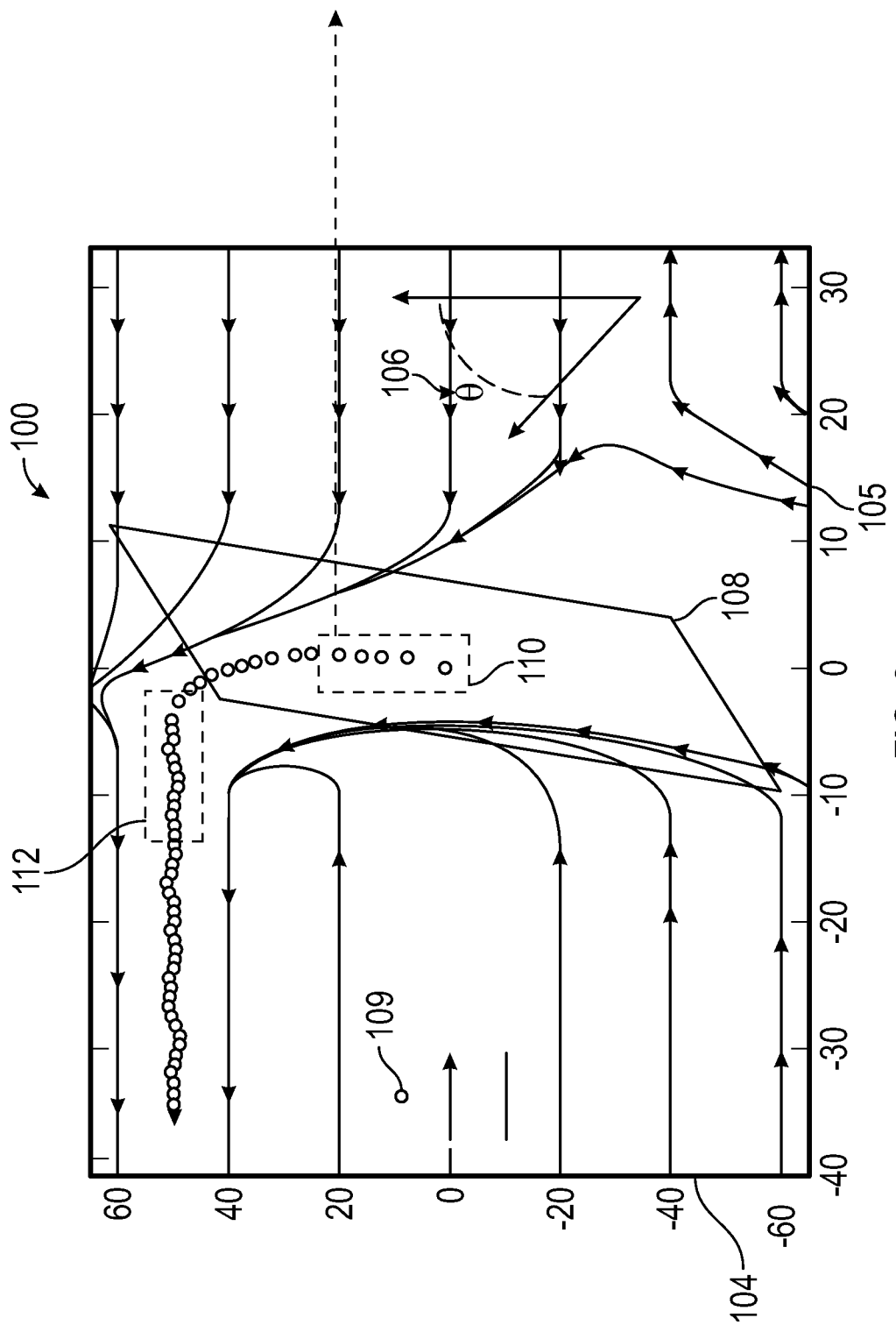
FIG. 2 depicts a phase portrait, in accordance with various embodiments.

Referring to FIG. 2, a phase portrait 100 of yaw rate r along a y-axis 104 and side slip angle β along an x-axis 105 is depicted. Body motion data points 109 are plotted in the phase portrait. A stable region 108 of the phase portrait is furthermore depicted showing a boundary for the body motion data points 109 will generally represent vehicle body stability. According to the present disclosure, patterns of the body motion data points 109 have been found to provide an early prediction and an actual detection of vehicle body instability. In particular, when the body motion data points 109 trend generally vertically in the phase portrait 100 (substantially constant side slip angle β and changing yaw rate r) with sufficient speed, then a prediction pattern 110 can be identified, which provides the early prediction of vehicle instability. When the body motion data points 109 trend generally horizontally in the phase portrait 100 (substantially constant yaw rate r with changing side slip angle β), then a detection pattern 112 can be identified, which is indicative of the detection of a current vehicle instability event. The system 200 for detecting and predicting vehicle instability derives phase portrait parameters and determines whether conditions describing the prediction pattern 110 or the detection pattern 112 are met. In embodiments, the phase portrait parameters include the phase portrait angle θ 106 between yaw rate r side slip angle β for a sample window of a plurality of body motion data points 109 and a speed of movement M of the sample window of body motion data points 109. The speed of movement M will be lower for consecutive body motion data points 109 that are relatively close together and higher for consecutive body motion data points 109 that are relatively spaced apart.

The system 200 for detecting and predicting vehicle instability will now be described in greater detail with reference to FIG. 3. The system 200 for detecting and predicting vehicle instability includes a reference data source 214, the sensor system 28, a vehicle instability processing system 202 and a vehicle motion control system 220. The sensor system 28 provides sensor data 240 allowing parameters indicative of phase portrait motion patterns to be derived by the vehicle instability processing system 202. The vehicle instability processing system 202 evaluates the parameters indicative of phase portrait motion patterns to provide an early prediction of vehicle body instability and to detect current vehicle body instability. The vehicle instability processing system 202 outputs vehicle instability data 226 embodying the prediction and/or detection of vehicle body instability for use in correcting constraints or other parameters of the vehicle motion control system 220 in order to bring the vehicle into a more stable condition. The vehicle instability processing system 202 performs stability recovery detection in order to reset vehicle instability and prediction flags that have been set by the vehicle instability processing system 202.

In the exemplary embodiment of FIG. 3, the sensor system 28 provides sensor data 240 including measurements or estimations of yaw rate r, lateral acceleration $A_y$ and longitudinal velocity $V_x$ for the vehicle 10. The sensor data 240 is provided to the vehicle instability processing system 202 to predict and detect vehicle instability without use of road surface condition data and tire model/information. The vehicle instability processing system 202 includes a pre-processing module 208 configured to receive the sensor data 240 and to perform various operations thereon. The pre-processing module determines a time derivative of yaw rate $\dot{r}$ and a time derivative of side slip angle $\dot{\beta}$ according to the following equations:

$$\dot{r} = \frac{dr}{dt} \quad \text{(equation 1)}$$

$$\dot{\beta} \cong \frac{A_y}{V_x} - r \quad \text{(equation 2)}$$

Furthermore, in some embodiments, the pre-processing module 208 applies an averaging function to the yaw rate $\dot{r}$ and a time derivative of side slip angle $\dot{\beta}$ or to the incoming sensor data 240. The averaging function may be a moving average function. The pre-processing module 208 outputs pre-processed measurement data 232 including paired derivative of yaw rate and derivative of side slip angle, which are representative of body motion data points 109 as described with respect to FIG. 2 and can be used to derive the phase portrait parameters indicative of vehicle body instability.

The vehicle instability processing system 202 includes a vehicle instability prediction module 204 and a vehicle instability detection module 206. The vehicle instability prediction module 204 implements a series of conditions that are evaluated with respect to phase portrait parameters derived from the pre-processed measurement data 232 to identify the prediction pattern 110 described with respect to FIG. 2. The vehicle instability detection module 206 implements a series of conditions that are evaluated with respect to phase portrait parameters derived from the pre-processed measurement data 232 to identify the detection pattern 112 described with respect to FIG. 2.

The vehicle instability prediction module 204 receives a sample window of p pre-processed measurement data 232. The pre-processed measurement data 232 is time series data, with the most recent data point being labelled as $t_k$. The sample window size is defined as $t_{k-p}:t_k$. The vehicle instability prediction module 204 identifies the prediction pattern 110 based on the following conditions being fulfilled: for $t=t_{k-p}:t_k$, $$\theta = \tan^{-1}(-\dot{\beta}, \dot{r}) = \begin{cases} 0, & \dot{r} \geq 0 \\ +\pi, & \dot{r} < 0 \end{cases} \quad \text{(equation 3)}$$

$$M = \sqrt{K_1 \dot{r}^2 + K_2 \dot{\beta}^2} > C_1 \quad \text{(equation 4)}$$

$$|\Delta r_{t_{k-p}:t_k}| \geq C_2 \quad \text{(equation 5)}$$

Equation 3 represents a determination of the phase portrait angle θ 106. The phase portrait angle θ 106 should equate to the sample window of pre-processed measurement data 232 corresponding to a substantially vertical pattern in the phase portrait 100. Equation 4 represents a speed of movement (or extent of spread) M of data points included in the sample window of the pre-processed measurement data 232. $K_1$ and $K_2$ are calibratable weighting factors that are provided in the reference data 238 from the reference data source 214. $C_1$ is a calibratable constant providing a threshold for the speed of movement above which the prediction pattern is identifiable. Equation 5 represents a third condition requiring a sufficient amount (greater than the calibratable constant $C_2$) of total movement/change in yaw rate r over the sample window. For the prediction pattern 110 to be identified, equations 3, 4 and 5 should be fulfilled. However, each of the conditions of equations 3, 4 and 5 are indicative of the prediction pattern 110 and may be applied independently or in any combination. When the vehicle instability prediction module 204 assesses, based on equations 3, 4 and 5, that the prediction pattern 110 exists, instability prediction output data 228 is provided indicating such. The instability prediction output data 228 can include a Boolean prediction flag or a more granular variable representing certainty of the prediction or the like.

The vehicle instability detection module 206 receives a sample window of p pre-processed measurement data 232. The number p for the vehicle instability detection module 206 may be different from the number p for the vehicle instability prediction module 204. The pre-processed measurement data 232 is time series data, with the most recent data point being labelled as $t_k$. The sample window size is defined as $t_{k-p}$:$t_k$. The vehicle instability detection module 206 identifies the detection pattern 112 based on the following conditions being fulfilled:

for t=$t_{k-p}$:$t_k$, $$\theta = \tan^{-1}(-\dot{\beta}, \dot{r}) = \begin{cases} \frac{\pi}{2}, r \geq 0 \\ -\frac{\pi}{2}, r < 0 \end{cases} \quad \text{(equation 6)}$$

$$M = \sqrt{K_1 \dot{r}^2 + K_2 \dot{\beta}^2} > C_3 \quad \text{(equation 7)}$$

$$\int_{t_{k-p}}^{t_k} |\dot{\beta}| dt \geq C_4 \quad \text{(equation 8)}$$

Equation 6 represents a determination of the phase portrait angle θ 106. The phase portrait angle θ 106 should equate to the sample window of pre-processed measurement data 232 corresponding to a substantially horizontal pattern in the phase portrait 100. Equation 7 represents a speed of movement (or extent of spread) M of data points included in the sample window of the pre-processed measurement data 232. $K_1$ and $K_2$ are calibratable weighting factors that are provided in the reference data 238 from the reference data source 214. $C_3$ is a calibratable constant providing a threshold for the speed of movement above which the prediction pattern is identifiable. Equation 8 represents a third condition requiring a sufficient amount (greater than the calibratable constant $C_4$) of total movement/change in side slip angle β over the sample window. For the detection pattern 112 to be identified, equations 6, 7 and 8 should be fulfilled. However, each of the conditions of equations 6, 7 and 8 are indicative of the detection pattern 112 and may be separately applied or in any combination. When the vehicle instability detection module 206 assesses, based on equations 6, 7 and 8, that the detection pattern 112 exists, instability detection output data 230 is provided indicating such. The instability prediction output data 228 can include a Boolean prediction flag or a more granular variable representing certainty of the prediction or the like.

In embodiments, the instability detection output data 230 (e.g. a detection flag) and the instability prediction output data 228 (e.g. a prediction flag) are output as part of vehicle instability data 226 for further processing by the vehicle motion control system 220. In one embodiment, a stability level determination module (not shown) is responsive to a detection flag from the vehicle instability detection module 206 to determine a level of instability. The level of instability may be calculated according to equation 9:

$$\text{Level of Instability} = \int_{t_1}^{t_2} |\dot{\beta}| dt \quad \text{(equation 9)}$$

t1 represents a time when instability is first determined by the vehicle instability detection module 206. t2 is a later time point (e.g. about 2 seconds later) when the integral of rate of side slip angle reasonably accurately indicates a level of instability. The quantification of level of instability can be included as part of vehicle instability data 226 for use by the vehicle motion control system 220.

In some embodiments, the vehicle instability processing system 202 includes a stability recovery detection module 212 for detecting when the conditions for instability prediction or detection are no longer present and changing the instability prediction output data 228 or the instability detection output data 230 accordingly (e.g. by resetting a prediction or detection flag). A variety of conditions can be used to detect that the instability prediction is no longer valid including one or more of: the phase portrait angle 106 is not vertical (e.g. the condition of equation 3 is not met); the speed magnitude M has reduced sufficiently (e.g. the condition of equation 4 is no longer met); yaw rate is approaching or is at zero; a ratio of current yaw rate to the yaw rate causing the vehicle instability prediction module 204 is less than a predetermined constant; and longitudinal velocity of the vehicle is approaching or at zero. A variety of conditions can be used to detect that the instability detection is no longer valid including one or more of: the speed magnitude M has reduced sufficiently (e.g. the condition of equation 7 is no longer met); longitudinal velocity of the vehicle 10 is approaching or at zero; yaw rate is approaching or is at zero; and the integral of equation 9 from the time ($t_1$) when the vehicle instability detection module 206 detected vehicle instability to current time is approaching zero. Other conditions for resetting the prediction or detection flags may be used, additionally or alternatively. The changing of the instability prediction or detection output data 228, 230 upon detection of stability recovery is provided to the vehicle motion control system 220 as part of vehicle instability data 226. The vehicle motion control system can respond to such a change by ceasing to take corrective actions to stabilize the vehicle as the action already taken has been effective.

The vehicle motion control system 220 includes a vehicle motion control module 222 and a vehicle motion control adjuster 224, in accordance with various embodiments. The vehicle motion control module 222 generates vehicle motion control command data 242 embodying control actions to be taken by the actuator system 30 to control the vehicle. With additional reference to FIG. 1, the vehicle motion control command data 242 may control one or more actuator devices 42a-42n to control one or more vehicle features such as, but not limited to, the propulsion system 20, the transmission system 22, the steering system 24, and the brake system 26. The vehicle motion control module 222 implements a vehicle motion control algorithm such one or more of model predictive control and feedforward control algorithms. The vehicle motion control module 222 may utilize various constraints and variables in generating the vehicle motion control command data 242. The vehicle motion control adjuster 224 is responsive to the vehicle instability data 226 to adjust the vehicle motion control module 222 based thereon in order to correct vehicle instability conditions. In one embodiment, the vehicle motion control adjuster 224 may implement a constraint calculator to adjust constraints or variables used by the vehicle motion control module 222. Such tweaking of constraints of a model predictive control algorithm (for example) can bring the vehicle back under stable control based on the vehicle instability data 226 determined by the vehicle instability processing system 202.

Referring now to FIG. 4, and with continued reference to FIGS. 1 to 3, a flowchart illustrates method 400 that can be performed by the system 200 for detecting and predicting vehicle instability in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. In various embodiments, the method 400 can be scheduled to run based on one or more predetermined events, and/or can run continuously during operation of the vehicle 10.

In step 410, sensor data 240 is received by the system 200 for detecting and predicting vehicle instability from the sensor system 28. The sensor data 240 includes yaw rate, lateral acceleration and longitudinal velocity. In step 420, the sensor data 240 is pre-processed, which may include applying a moving average function and calculating a time derivate of yaw rate and a time derivative of side slip angle. The moving average function may be applied to the sensor data 240 itself or to the time derivate of yaw rate and the time derivative of side slip angle. In step 430 phase portrait parameters are calculated based on the time derivative of yaw rate and the time derivative of side slip angle. The phase portrait parameters include the phase portrait angle 106 and the speed magnitude M for a most recent sample window of the pre-processed measurement data 232 from step 420. The phase portrait angle 106 is representative of the angle between yaw rate and side slip angle in the phase portrait and the speed magnitude M is representative of the spread or speed of change of the data points (each comprising a pair of yaw rate and side slip angle) in the phase portrait.

In step 440, the phase portrait parameters from step 430 are used to evaluate phase portrait conditions predicting an upcoming vehicle instability event. In particular, the phase portrait conditions include a substantially vertical trend of data points in the phase portrait 100 that have a speed of change above a certain minimum threshold, which would indicate the prediction pattern 110. In one embodiment, equations 3 to 5 are evaluated in step 440 to ascertain whether a vehicle instability prediction is made.

In step 450, the phase portrait parameters from step 430 are used to evaluate phase portrait conditions detect a current vehicle instability event. In particular, the phase portrait conditions include a substantially horizontal trend of data points in the phase portrait 100 that have a speed of change above a certain minimum threshold, which would indicate the prediction pattern 110. In one embodiment, equations 6 to 8 are evaluated in step 450 to ascertain whether a vehicle instability prediction is made. In some embodiments, only one of the prediction step 440 and the detection step 450 is performed.

In step 460, vehicle motion is controlled to correct for vehicle instability when step 440 and/or 450 indicates predicted or detected vehicle instability. For example, constraints of a model predictive control algorithm can be adjusted based on the detected or predicted vehicle instability. In some embodiments, a level of instability is determined per equation 9 that is used as a basis for the adjustment of the constraints. In step 470, stability recovery is detected, resulting in resetting of the prediction or detection flags. The vehicle motion control can cease to be adjusted to correct for vehicle instability. Stability recover can be determined in a number of ways. In particular, ending of the conditions leading to the prediction or detection of vehicle instability in steps 440 and 450 are, at least partly, determinative on vehicle stability recovery detection. In the absence of detection of vehicle stability recovery detection, the vehicle motion control continues to be adjusted to bring the vehicle into a more stable state.

According to the systems and method described herein, phase portrait parameters are derived to identify phase portrait patterns for body stability monitoring. An early indication algorithm predicts the stability behavior of the vehicle body. The onset of vehicle body instability is identified using phase portrait derived parameters. The methods and systems do not depend on a tire model and are independent of road conditions. A minimum number of measurements and reliable estimations can be used to predict and detect vehicle instability, ensuring a low computation budget. Further, early flag and detection flag reset mechanisms are provided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for controlling a vehicle, comprising:
    a sensor system; and
    at least one processor in operable communication with the sensor system, wherein the at least one processor is configured to execute program instructions, wherein the program instructions are configured to cause the at least one processor to:
        receive yaw rate values, lateral acceleration values and longitudinal velocity values for the vehicle from the sensor system;
        determine side slip angle parameter values based on the yaw rate values, lateral acceleration values and longitudinal velocity values;
        determine phase portrait angles based on the side slip angle parameter values and the yaw rate values, wherein the phase portrait angles each represent an angle between yaw rate and side slip angle for the vehicle in a phase portrait of yaw rate and side slip angle;
        detect or predict vehicle instability based at least on the phase portrait angles; and
        when vehicle instability is detected or predicted, control the vehicle to at least partly correct the vehicle instability,
            wherein the program instructions are configured to cause the at least one processor to determine speed magnitude values based on side slip angle parameter values and the yaw rate values, wherein the speed magnitude values represent a spread of time-spaced body motion data points within a sample time window, wherein the time spaced body motion data points are each made up of a pair of one of the speed magnitude values and one of the side slip angle parameter values, and wherein detecting or predicting vehicle instability is based at least on the phase portrait angles and the speed magnitude values.

2. The system of claim 1, wherein the side slip angle parameter values are a time derivative of side slip angle values and wherein the program instructions are configured to cause the at least one processor to determine a time derivative of the yaw rate values and to determine the phase portrait angles based on the time derivative of the yaw rate values and the time derivative of the side slip angle values.

3. The system of claim 1, wherein determining the phase portrait angles includes an inverse tangent function based on the side slip angle parameter values and the yaw rate values.

4. The system of claim 1, wherein detecting or predicting vehicle instability includes an early prediction of vehicle instability and a detection of vehicle instability.

5. The system of claim 4, wherein the early prediction of vehicle instability is performed based at least on the phase portrait angles and on a minimum amount of change in the yaw rate values.

6. The system of claim 4, wherein the detection of vehicle instability is performed based at least on the phase portrait angles and on a minimum amount of change in the side slip angle parameter values.

7. The system of claim 4, wherein the early prediction of vehicle instability is performed based at least on the phase portrait angles representing a substantially vertical path in the phase portrait defined by changing yaw rate and substantially constant side slip angle.

8. The system of claim 4, wherein the detection of vehicle instability is performed based at least on the phase portrait angles representing a substantially horizontal path in the phase portrait defined by changing side slip angle and substantially constant yaw rate.

9. The system of claim 1, when vehicle instability is detected or predicted, the program instructions are configured to cause the at least one processor to determine a level of instability of the vehicle based on the side slip angle parameter values and to control the vehicle to at least partly correct the vehicle instability based at least on the level of instability.

10. The system of claim 1, wherein the motion of the vehicle is controlled to at least partly correct the vehicle instability by adjusting constraints in a model predictive control algorithm.

11. The system of claim 1, detecting or predicting vehicle instability is not based on road surface information or tire information.

12. A method for controlling a vehicle, comprising:
receiving, via at least one processor, yaw rate values, lateral acceleration values and longitudinal velocity values for the vehicle from a sensor system;
determining, via the at least one processor, side slip angle parameter values based on the yaw rate values, lateral acceleration values and longitudinal velocity values;
determining, via the at least one processor, phase portrait angles based on the side slip angle parameter values and the yaw rate values, wherein the phase portrait angles each represent an angle between yaw rate and side slip angle for the vehicle in a phase portrait of yaw rate and side slip angle;
detecting or predicting, via the at least one processor, vehicle instability based at least on the phase portrait angles; and
when vehicle instability is detected or predicted, controlling, via the at least one processor, motion of the vehicle to at least partly correct the vehicle instability
wherein the program instructions are configured to cause the at least one processor to determine speed magnitude values based on side slip angle parameter values and the yaw rate values, wherein the speed magnitude values represent a spread of time-spaced body motion data points within a sample time window, wherein the time spaced body motion data points are each made up of a pair of one of the speed magnitude values and one of the side slip angle parameter values, and wherein detecting or predicting vehicle instability is based at least on the phase portrait angles and the speed magnitude values.

13. The method of claim 12, wherein the side slip angle parameter values are a time derivative of side slip angle values, the method comprises determining, via the at least one processor, a time derivative of the yaw rate values and determining the phase portrait angles is based on the time derivative of the yaw rate values and the time derivative of the side slip angle values.

14. The method of claim 12, wherein determining the phase portrait angles includes an inverse tangent function based on the side slip angle parameter values and the yaw rate values.

15. The method of claim 12, wherein detecting or predicting vehicle instability includes an early prediction of vehicle instability and a detection of vehicle instability.

16. The method of claim 15, wherein the early prediction of vehicle instability is performed based at least on the phase portrait angles and on a minimum amount of change in the yaw rate values.

17. The method of claim 15, wherein the detection of vehicle instability is performed based at least on the phase portrait angles and on a minimum amount of change in the side slip angle parameter values.

18. A vehicle, comprising:
a sensor system; and
at least one processor in operable communication with the sensor system, wherein the at least one processor is configured to execute program instructions, wherein the program instructions are configured to cause the at least one processor to:
receive yaw rate values, lateral acceleration values and longitudinal velocity values for the vehicle from the sensor system;
determine side slip angle parameter values based on the yaw rate values, lateral acceleration values and longitudinal velocity values;
determine phase portrait angles based on the side slip angle parameter values and the yaw rate values, wherein the phase portrait angles each represent an angle between yaw rate and side slip angle for the vehicle in a phase portrait of yaw rate and side slip angle;
detect or predict vehicle instability based at least on the phase portrait angles; and
when vehicle instability is detected or predicted, control motion of the vehicle to at least partly correct the vehicle instability
wherein the program instructions are configured to cause the at least one processor to determine speed magnitude values based on side slip angle parameter values and the yaw rate values, wherein the speed magnitude values represent a spread of time-spaced body motion data points within a sample time window, wherein the time spaced body motion data points are each made up of a pair of one of the speed magnitude values and one of the side slip angle parameter values, and wherein detecting or predicting vehicle instability is based at least on the phase portrait angles and the speed magnitude values.

* * * * *